Jan. 26, 1954  T. R. SMITH  2,667,389
BEARING CONSTRUCTION
Filed Aug. 28, 1947  2 Sheets-Sheet 1
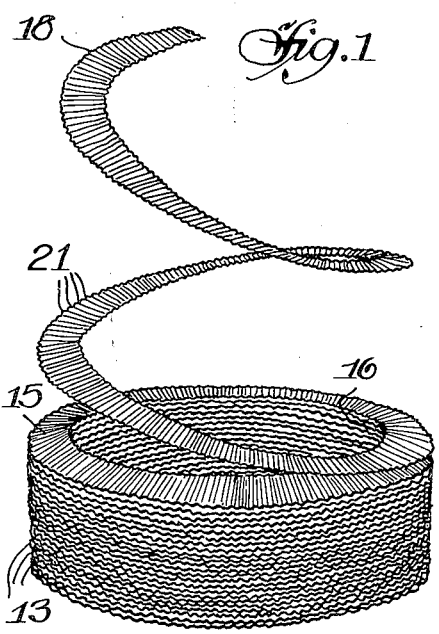
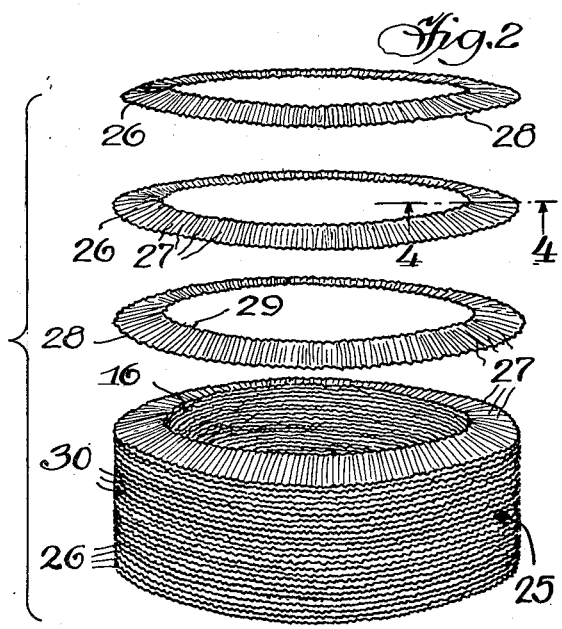
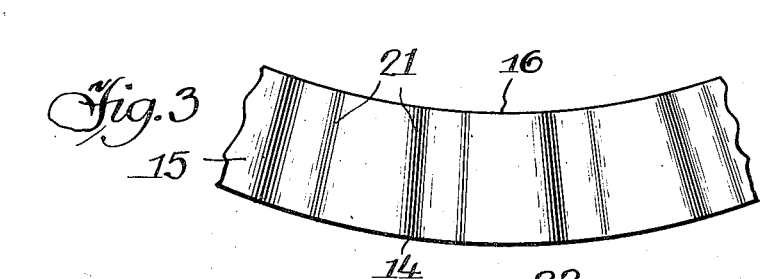
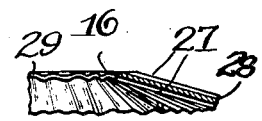
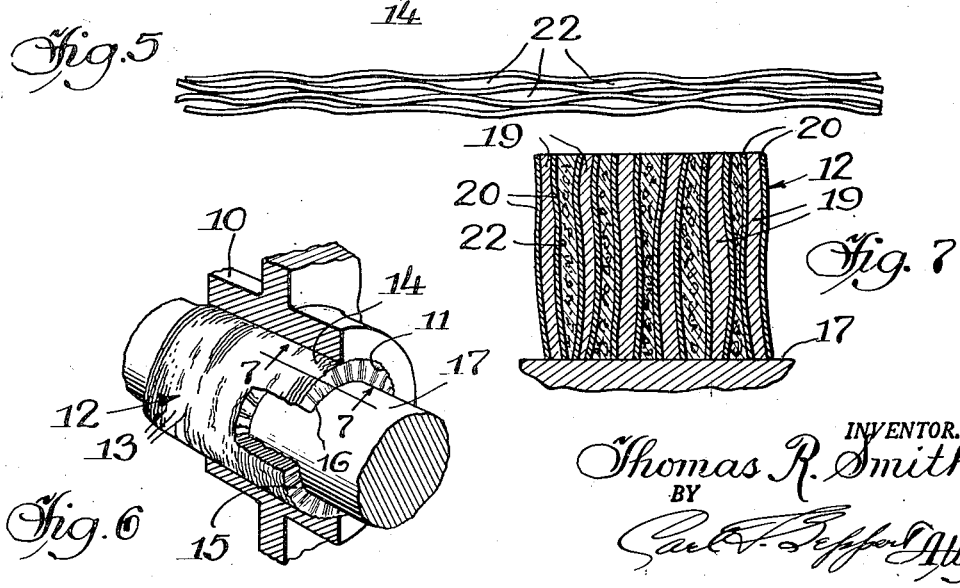
INVENTOR.
Thomas R. Smith
BY

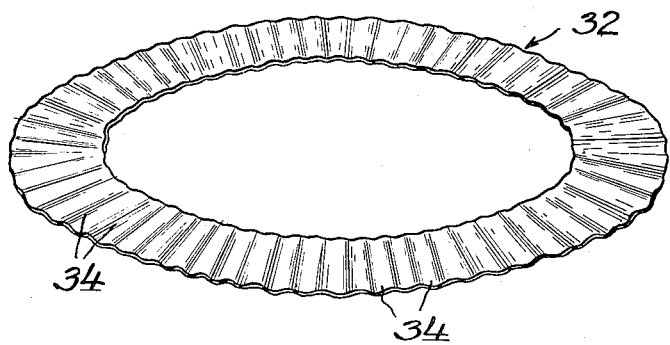
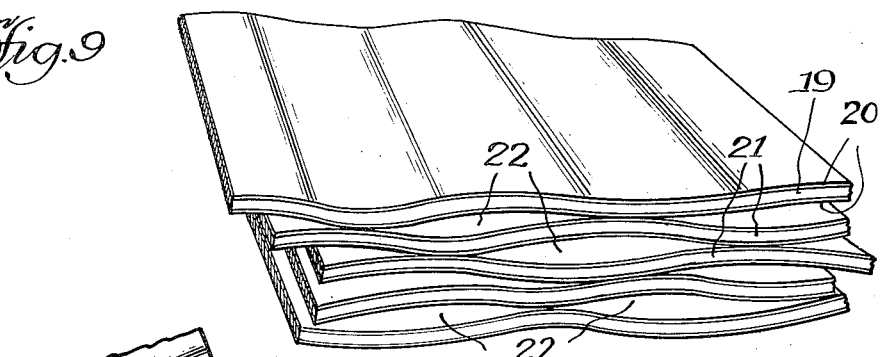
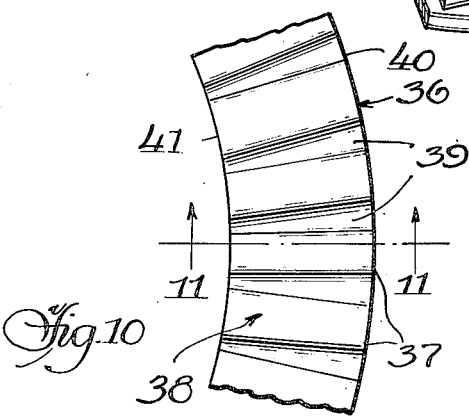
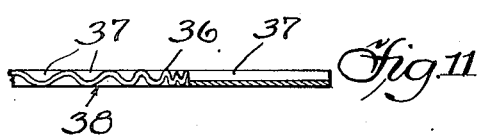
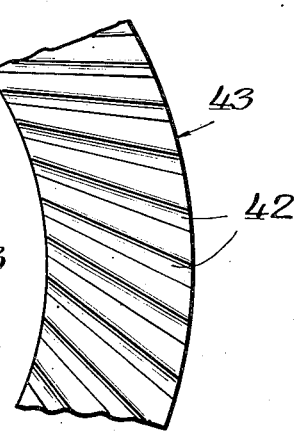
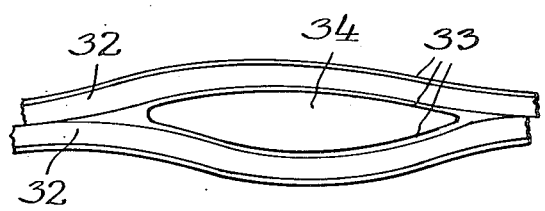

Patented Jan. 26, 1954

2,667,389

UNITED STATES PATENT OFFICE 2,667,389

BEARING CONSTRUCTION

Thomas R. Smith, Newton, Iowa, assignor to The Maytag Company, Newton, Iowa, a corporation of Delaware Application August 28, 1947, Serial No. 771,103

30 Claims. (Cl. 308—240)

The present invention relates to bearings or bushings and more particularly to bearings having permanent lubrication properties or characteristics, and it has for an object to provide an improved bearing construction of the character set forth.

The usual types of bearings or bushings having permanent lubrication characteristics now on the market are commonly referred to as "Oilless bearings" and they are made of powdered bronze, aluminum or iron, compressed into the desired shape and sintered to form a unitary bearing structure. This method of treating produces a bearing having a relatively porous internal structure and it is impregnated with lubricant to provide a bearing capable of lubricating a shaft journaled therein for long periods of time due to capillary attraction of lubricant to the bearing surface without the requirement of additional lubricant. Also, wood bearings with lubricant impregnated into its pores are utilized in many applications for the same purpose as the metal bearings.

In the structure of the present novel invention a bearing having somewhat the same permanent lubrication characteristics is provided. However, in this case the bearing or bushing is preferably constructed from relatively thin ribbon or strip-like material formed either in the shape of a coil or of individual rings or washers and provided with a relatively large number of small corrugations or crinkles extending substantially radially across the width of the material to its inner and outer edges. These coils or rings are stacked in layers to the desired length of thickness, and adjacent layers are bonded together into a unitary bearing structure in any suitable manner, after which the bearing is cut and bored to the desired size or dimensions. After bonding, between each layer of material and at the bottom of each corrugation or crinkle, there remains small passages or interstices extending through the bearing from the outer to the inner surfaces. These interstices are impregnated with lubricant in any suitable manner, and when a shaft is journaled therein provides a bearing having permanent lubrication characteristics.

The invention further comprehends a novel bearing structure that is light in weight, strong and due to the radial formation of its ribbon material it has good radial load carrying characteristics.

It is another object of this invention to provide a low-cost bearing having permanent lubrication characteristics.

It is still another object of this invention to provide an improved journal bearing for a shaft which has a relatively large number of small passages or interstices opening toward the shaft to provide for the storage of lubricant therein.

A further object of this invention is to provide an improved bearing construction which is formed of layers of strip material having interstices therebetween to provide adequate and effective lubricant storage space.

A still further object of this invention is to provide an improved permanent lubricated bearing construction formed of layers of material bonded together with a plurality of outwardly and inwardly opening relatively small passages therebetween for the storage of a relatively large quantity of lubricant.

These and other objects are effected by the invention, as will be apparent from the following description and claims taken in connection with the accompanying drawing forming a part of this application, in which:

Figure 1 is a perspective view of one form of the present novel bearing construction formed as a crinkled spiral coil of paper or suitable fabric, but with an end thereof pulled away to more clearly disclose its novel construction.

Fig. 2 is a view similar to Fig. 1 but showing another form of the invention in which the bearing construction is formed of a plurality of crinkled washers or rings.

Fig. 3 is an enlarged top plan view of a fragment or section of one of the coils or washers.

Fig. 4 is a cross-sectional view taken in a plane represented by the line 4—4 of Fig. 2.

Fig. 5 is an enlarged partial sectional view showing the openings or interstices between adjacent ribbons or strips and the bonding material therefor.

Fig. 6 is a perspective view of the improved bearing construction mounted in a housing with parts broken away to show the details of construction.

Fig. 7 is an enlarged cross-sectional view taken in a plane represented by the line 7—7 of Fig. 6.

Fig. 8 is a perspective view of a crinkled washer or ring formed of metal rather than of paper or fabric.

Fig. 9 is an enlarged fragmentary view in perspective of a plurality of the coils or washers in contacting engagement and showing the openings or interstices between adjacent ribbons or strips and the bonding material therefor.

Fig. 10 is a fragmentary top plan view of a ribbon or strip formed with relatively closely spaced radial corrugations.

Fig. 11 is a cross-sectional view taken on the line 11—11 of Fig. 10.

Fig. 12 is an enlarged partial sectional view showing the manner of bonding together the adjacent metal ribbons or washers.

Fig. 13 is a fragmentary top plan view of another ribbon or strip of material in which the corrugations are not radially disposed.

Referring now to the disclosure in the drawings, there is shown in Fig. 6 a bearing supporting means or housing 10 having a cylindrical opening 11 therein adapted to engage and support a tubular bearing structure or bushing member 12, formed of a plurality of radially disposed layers of ribbon or strip-like material 13 having an outer cylindrical surface 14 mating with and closely fitting the opening 11 in the housing. This tubular bearing structure is provided with a body portion 15 and a bore, inner surface or cylindrical opening 16 in which a rotary shaft 17 is journaled.

The tubular bearing structure 12 as shown in Fig. 1, comprises in one form a continuous single length of pliable relatively thin and wide ribbon or strip-like material 18, preferably made of paper or cloth 19, coated with a plastic monomer or thermoplastic resin 20 in order to stiffen and strengthen the material and to act as a bonding agent. Also it is provided with a large number of relatively small crinkles or corrugations 21 preferably extending across the width of the material in any suitable manner. This ribbon is coiled or wound spirally upon itself without axial twisting to provide the substantially centrally disposed circular opening 16 and each thin layer of ribbon material 18 rests or lays upon its adjacent layer and extends through the body 15 of the bearing with the crinkles or corrugations 21 extending substantially radially thereacross.

In order to provide a crinkle or corrugation 21 having a substantially uniform depth and shape throughout its length, the ribbon material 18 is wound so that the surface, constituting the width of the material, tends to form a frustum of a cone or dish shape. When a sufficient number of layers or turns of the ribbon material 18 are stacked or assembled together to provide the body portion 15 of the bearing assembly of the desired length, the assembly is placed in a fixture and compressed without undue flattening of the crinkles and heated to a predetermined temperature to cause the thermoplastic resin 20 to soften and bond adjacent layers 13 of the ribbon material 18 together, after which it is allowed to cool. After this operation, the adjacent layers of material 13 adhere to each other and thus form the solid unitary bearing structure 12 which is able to be machined or cut to fit the shape and dimensions of the bearing housing 10 and the shaft 17. With the ribbon material 18 disposed in a circular manner about a frusto-conical plane (see Fig. 4) and extending completely through the body portion 15 of the bearing as shown, the bearing structure is greatly strengthened and is capable of withstanding relatively high bearing loads.

Between each layer of material 13 and at the bottom of each crinkle 21 there remains after bonding a small substantially uniform unobstructed passage or interstice 22 extending substantially radially through the body portion 15 of the bearing and opening at the outer end the inner surfaces 14 and 16 respectively. As the total length of each passage or interstice 22 is preferably considerably or many times longer than its width, there is provided a relatively large space behind each opening. Thus, when a multiplicity or larger number of interstices 22 are incorporated in the body portion 15 of a bearing structure of this type a relatively large reservoir or storage space for lubricant is provided, and it is in these interstices that lubricant such as, for example, grease, is applied in any suitable manner. Preferably, the bearing is placed in a vat or container with liquefied grease therein and permitted to remain there until substantially all of the interstices or openings 22 have become filled with grease. After filling or impregnating the bearing with grease it is capable of journaling a shaft for long periods of time without further attention and may be used in many applications to which the usual type of metallic or wooden permanently lubricated bearings are now applied.

It can be seen from the above description and drawings that a bearing structure of this type although formed from relatively low strength materials is when constructed and treated as shown, rigid and is capable of carrying relatively high radial bearing loads. In fact, under some conditions it has been found that a bearing structure of this type outwears bearings made from powdered metals. Also, with this bearing structure, foreign particles capable of scoring or marring the shaft or bearing surface and causing premature wearing and damage to the assembly are in most cases forced into one or more of the small openings or interstices in the bearing away from the rubbing surface and they thereby cause very little, if any, damage.

Another advantage of the above mentioned bearing structure is that its total weight is approximately but one-seventh the weight of a metal bearing having similar dimensions, an important feature in many installations. Also, due to the size of the interstices and the natural attraction of the exposed surfaces therein, lubricant will not readily flow therefrom until required for lubricating purposes. Therefore, the bearing may be impregnated with lubricant and stored for long periods of time without losing its lubricating qualities.

By forming the bearing from a continuously spirally wound strip of material, there is a tendency for the shaft as it rotates to cause a slight pumping action along the bearing surface, and by positioning the bearing properly in certain installations this pumping action may be utilized to advantage. For example, where there is a pressure drop across the bearing the spiral of the bearing and the rotation of the shaft may be arranged and utilized to pump against the side having the higher pressure.

Although a bearing structure formed as described above is economical to build, this slight pumping action may be objectionable in some instances. Therefore, in order to provide a bearing with little or no pumping action along the shaft, there is provided in Fig. 2 a bearing structure or bushing member 25 comprising a plurality of relatively thin pliable crinkled or corrugated washer elements 26. These washers are made from materials similar to that employed in the embodiment of Fig. 1 and are formed with a large number of substantially radially extending and relatively small crinkles or corrugations 27 extending across the width of the body portion of the washer from the outer to the inner edges 28 and 29, respectively. In order to maintain this crinkle substantially uniform, the washers are dished or frusto-conically shaped.

In assembling this bearing structure the washers 26 are stacked or laminated in position one upon the other, with a coating 20 of plastic resin thereon to provide a tubular member of the proper length with their inner openings 29 mated or aligned to form the cylindrical opening 16 for journaling the shaft 17.

The combined assembly is compressed in a fixture and heated so that the adjacent frusto-conically shaped washers 26 are bonded together to form the solid unitary bearing structure 25, while at the same time leaving interstices 30 between each washer at the bottom of each crinkle 27 for the storage of a relatively large quantity of lubricant as heretofore mentioned. After this the structure may be machined to fit the shaft 17 and housing 10 as desired and lubricant is impregnated therein. This bearing structure has the same characteristics as the previously described bearing structure 12, but it will not have the tendency to pump lubricant along the shaft.

Fig. 8 discloses a thin crinkled metallic ribbon or strip 32 which is adapted to be substituted for the crinkled cloth or fabric spiral ribbon 18 of Fig. 1 or the individual washers 26 as shown in Fig. 2. When layers or laminations of thin metal strips or washers are used as the bearing member, the sides of the metal strips or washers are coated with a brazing compound 33 (see Fig. 12). A plurality of these members are then placed in a jig or fixture and heated in any suitable manner, with the brazing compound softening and bonding the adjacent metal strips or washers 32 together into a unitary bearing structure with a large number of small substantially radially extending interstices 34 between each layer of metal for the reception and retention of lubricant. It can be seen that this particular bearing structure has the same utility as those mentioned previously and may be utilized equally as well in either the ribbon or the washer type of bearing structure. However, in this case the bearing assembly would have a greater weight and likewise a greater strength for withstanding relatively heavy radial bearing loads.

In Figs. 10 and 11 there is shown a slightly modified form of strip or ribbon structure which may be substituted for that disclosed in Figs. 2, 3 or 6. In this case strips of ribbon material 36 are provided with a large number of relatively narrow or small corrugations or crinkles 37 so that the ribbon or washers 38 lay substantially flat on a plane normal to the axis of its circle and not tend to assume a dished or frusto-conical shape when stacked or wound in layers. In this construction it is obvious that the passages or interstices 39 will not have a substantially uniform shape from the outer to the inner edges 40 and 41 respectively, but they will have a tendency to be larger at the outer edge 40 and narrowed or constricted at the inner edge 41. Although the shape of the interstices is modified slightly, the utility has not been impaired and this structure is likewise capable of storing a relatively large quantity of lubricant for lubricating the shaft 17.

Although the corrugations or crinkles forming the interstices are generally described as extending radially across the body portion of the bearing, this is only the most convenient way of applying the crinkles. The crinkles or corrugations 42 in the washers 43 may be formed or disposed in the ribbon or washers so that the interstices open toward the shaft substantially tangent thereto or at any angle therebetween as shown in Fig. 13, without departing from the spirit of the invention. Likewise, these crinkles or corrugations do not have to be straight in that it is possible to produce them in a curved manner. Also, it is possible to provide a ribbon or washer with small closely spaced channels on one side only of the material so that when assembled a plurality of small passages or interstices are provided between each layer of material. Furthermore, although the bearing structure has been described as being formed in a tubular manner and used as such, it is perfectly obvious that the structure may be cut along its axis to provide a split or multiple bearing structure.

From the foregoing it can be seen that an improved bearing structure has been provided which is relatively light in weight, may be formed of relatively cheap materials, has a relatively large storage capacity for the reception and retention of lubricant, is durable because of the solid material extending through the body of the bearing, and may be utilized in a large portion of the installations wherein bearings having permanent lubrication characteristics are now usable or desired. Likewise, it is obvious that as lubricant is required at the bearing surface, capillary attraction will cause the lubricant to leave the small passages or interstices and flow to that portion of the surface requiring lubrication.

While the present invention has been shown in several forms, it will be obvious to those skilled in the art that the invention is not limited to such embodiments, but is susceptible to various changes and modifications without departing from the spirit thereof.

Having thus disclosed the invention, I claim:

1. A self-lubricating bearing construction comprising a bearing member composed of multiple layers of material provided with a bore therein for receiving a shaft, said layers being disposed axially of the shaft with an edge thereof defining the bore and the bearing having a relatively large number of small passages of greater length than their widths and terminating in said bore for storing lubricant for lubricating the shaft.

2. In a self-lubricating bearing construction, a bearing structure comprising a body portion composed of multiple layers of material having an outer surface and provided with a bore therein for journalling and supporting a shaft, said body portion being provided between the layers with a relatively large number of small passages therein of considerably greater length than their widths and extending through said body portion from its outer surface to the bore for receiving and storing lubricant therein.

3. A bearing construction comprising a body portion formed from a length of ribbon-like material spirally wound in layers with a centrally disposed opening therein for receiving and journalling a shaft, said layers having an undulated surface contour providing a plurality of substantially radial passages therebetween, and means for uniting the body portion to form a unitary bearing structure.

4. A bearing comprising a length of pliable ribbon-like material spirally wound to form a plurality of adjacent layers of ribbon material for a central and substantially cylindrical opening therein for journaling a shaft, and means for uniting the layers of material to form a unitary bearing structure with passages therein opening toward said cylindrical opening between adjacent layers for the storage of lubricant.

5. A bearing construction comprising a length of pliable crinkled ribbon material spirally wound to provide adjacent layers of the material with lubricant-holding interstices therebetween and a substantially centrally disposed opening therein for receiving and journalling a shaft, and bonding material disposed on said ribbon to join and hold the layers to provide a unitary bearing structure.

6. In a self-lubricating bearing construction comprising a plurality of layers of relatively thin and wide pliable ribbon-like material circularly wound to provide a bearing member having a centrally disposed opening in which a shaft is to be journalled, lubricant-holding channels provided on at least one side of and extending across the width of said ribbon, and a bonding material disposed on said ribbon material for bonding together adjacent layers and at the same time leave a substantial portion of the channels unobstructed therebetween for the reception and retention of lubricant.

7. In a self-lubricating unitary bearing construction comprising a plurality of layers of relatively thin pliable crinkled ribbon material assembled to provide a bearing member having a centrally disposed opening for the reception of a shaft, and a bonding agent disposed on said crinkled ribbon material to adhere together adjacent layers of such material with a multiplicity of interstices opening toward said centrally disposed opening between the layers for the reception and retention of lubricant.

8. The combination as claimed in claim 7 wherein said ribbon material is of a fibrous composition and said bonding agent is a plastic resin.

9. The combination as claimed in claim 7 wherein said ribbon material is metal and said bonding agent is a brazing compound.

10. A bearing construction comprising a plurality of relatively thin washer-like elements having mating openings therein and providing a bearing surface for receiving and supporting a shaft, and spaces between said elements for the reception of lubricant.

11. In a unitary bearing construction comprising a plurality of relatively thin washer elements stacked in layers and provided with substantially aligned openings for journalling and supporting a shaft therein, and means for bonding said washer elements together to provide a unitary bearing member but retaining relatively small spaces between adjacent elements for the storage of lubricant.

12. In a self-lubricated bearing construction, comprising a plurality of relatively thin crinkled washer elements stacked to provide a centrally disposed opening therethrough for supporting and journalling a shaft therein, and means for bonding together adjacent crinkled portions of the washer elements into a unitary bearing structure leaving a multiplicity of interstices therebetween opening toward said centrally disposed opening for the absorption and retention of lubricant.

13. In a self-lubricated unitary bearing construction comprising a body portion formed of a plurality of thin and relatively wide washer elements stacked to provide a bearing of the proper length, with an opening therein for supporting and journalling a shaft, said washer elements being provided with substantially radially disposed corrugations across their width, bonding material disposed on the outer surfaces of said washer elements for bonding the contacting portions of said washer elements into a unitary rigid bearing structure having a large number of interstices between adjacent elements along substantially all of the radially extending crinkles, and a lubricant disposed in said interstices for storage therein.

14. The combination as claimed in claim 13 wherein said washer elements are formed of a fibrous material and said bonding material is a plastic resin.

15. The combination as claimed in claim 13 wherein said washer element is formed of metal and said bonding material is a brazing compound.

16. In a self-lubricated unitary bearing construction comprising a plurality of thin and relatively wide washer elements provided with substantially centrally disposed uniform openings therein stacked to provide a bearing of the proper length for supporting and journalling a shaft therein, said washer elements also provided with substantially radially disposed corrugations across at least one face thereof, and bonding material disposed on at least one side of adjacent surfaces of said washer elements for causing said elements to adhere together into a unitary bearing structure with a substantial number of radially disposed unobstructed small passages therebetween and at the bottom of each corrugation and opening toward said centrally disposed opening, said passages being substantially longer than their widths and collectively acting as a relatively large reservoir for lubricant.

17. In a bearing construction, a plurality of relatively thin washer-like elements having mating openings for journalling a shaft therein, and means for joining said washer elements to form a unitary bearing structure provided with small spaces therebetween for the storage of lubricant.

18. In a self-lubricated unitary bearing construction comprising a plurality of thin frusto-conically shaped pliable washer elements provided with substantially centrally disposed openings therein for the reception of a shaft, said washer elements being stacked to provide a bearing of the desired length and provided with substantially radially disposed corrugations extending across the width thereof, and a bonding material disposed on adjacent surfaces of said washer elements for joining them together in a unitary bearing structure upon the application of heat and with a large number of radially disposed interstices between each washer element and at the bottom of substantially all of the corrugations, said interstices being substantially longer than their widths and opening toward said centrally disposed opening whereby they collectively act as a reservoir for a substantial quantity of lubricant with the shaft adapted to be journalled in and supported by said unitary bearing structure and lubricated by lubricant flowing from said interstices.

19. The combination as claimed in claim 18 wherein said frusto-conically shaped washer elements are formed of a fibrous material and said bonding material is a plastic resin.

20. The combination as claimed in claim 18 wherein said frusto-conically shaped washer elements are formed of metal and said bonding material is a brazing compound.

21. In a self-lubricating unitary bearing construction comprising a body portion formed of a length of pliable ribbon material spirally wound to provide frusto-conically shaped contacting layers of material with a substantially centrally disposed opening for receiving a shaft therein, said ribbon material being provided with crinkles extending across the width of the material to provide the body portion with a large number of substantially radial channels extending therethrough, a bonding agent disposed on the outer surface of said ribbon material to cause adherence to adjacent contacting portions of each layer of ribbon material into a unitary bearing structure upon the application of heat and providing the bearing construction with a large number of radially disposed interstices between these elements and at the bottom of substantially all of the corrugations and opening toward said centrally disposed opening, said interstices collectively acting as a reservoir for a substantial quantity of lubricant with the shaft adapted to be journalled in and supported by said unitary bearing structure and lubricated by lubricant flowing from said interstices.

22. In a self-lubricating unitary bearing construction comprising a plurality of substantially circular layers of relatively thin and wide pliable crinkled ribbon material assembled to provide a substantially centrally disposed opening therein for the reception of a shaft, said layers being stacked one on the other and being substantially flat on a plane normal to the axis of its circle, and a bonding agent on said crinkled ribbon material to adhere adjacent layers together to thereby provide a unitary bearing structure having a multiplicity of interstices between layers opening toward said centrally disposed opening, said interstices collectively acting as a reservoir for lubricant and with the shaft adapted to be journalled and supported in said opening and supplied with lubricant from said interstices.

23. A bearing structure in which a shaft is to be journalled comprising a bearing element formed of a plurality of thin and relatively wide laminae of pliable material with interstices extending across the width of the material for the reception of lubricant, and means for joining the laminae to form a unitary bearing element.

24. In a unitary bearing construction in which a shaft is to be journalled comprising a body portion formed of a plurality of layers of thin and relatively wide pliable material and having a plurality of interstices extending across the width of the material, and means for bonding the adjacent layers of material into a unitary bearing structure.

25. A bearing comprising a plurality of axially arranged layers; radial pores spaced at frequent intervals around the bearing surface and extending from said surface to the outside surface of the bearing body; and a lubricant disposed in said pores.

26. A bearing comprising a plurality of axially arranged layers held together by a non-continuous bond; frequently spaced pores extending radially from the bearing surface formed by the discontinuity of said bond between said layers; and a lubricant disposed in said pores.

27. A bearing comprising a plurality of axially arranged fibrous layers having frequently spaced radially extending irregularities in the surfaces thereof and held to one another by a non-continuous bond of a synthetic resin, said irregularities forming radially extending pores in the body of said bearing spaced substantially uniformly at frequent intervals around the bearing surface; and a lubricant disposed in said pores.

28. A bearing comprising a plurality of axially arranged layers of helically wound ribbon material; radial pores spaced at frequent intervals around the bearing surface and extending from said surface to the outside surface of the bearing body; and a lubricant disposed in said pores.

29. A bearing comprising a plurality of axially arranged layers composed of helically wound ribbon material and held together by a non-continuous bond; frequently spaced pores, formed by the discontinuity of said bond between said layers, extending radially from the bearing surface; and a lubricant disposed in said pores.

30. A bearing comprising a plurality of axially arranged layers of helically wound ribbon material having transverse rugosities thereon; resinous material securing said layers to one another; said rugosities forming radial pores spaced substantially uniformly at frequent intervals around the bearing surface; and a lubricant disposed in said pores.

THOMAS R. SMITH.

References Cited in the file of this patent

UNITED STATES PATENTS

| Number | Name | Date |
| --- | --- | --- |
| 784,762 | Shepard | Mar. 14, 1905 |
| 1,677,892 | Herbert et al. | July 24, 1928 |
| 1,789,092 | Apps | Jan. 13, 1931 |
| 1,974,235 | Cammen | Sept. 18, 1934 |
| 2,100,159 | Curstadt | Nov. 23, 1937 |
| 2,354,395 | Mason | July 25, 1944 |
| 2,421,704 | Kasten | June 3, 1947 |

FOREIGN PATENTS

| Number | Country | Date |
| --- | --- | --- |
| 553,673 | Great Britain | June 1, 1943 |